US010272754B2

(12) United States Patent
Johnson

(10) Patent No.: US 10,272,754 B2
(45) Date of Patent: Apr. 30, 2019

(54) MODULAR VEHICLE BED COVER APPARATUS

(71) Applicant: Brian R. Johnson, Knoxville, TN (US)

(72) Inventor: Brian R. Johnson, Knoxville, TN (US)

( * ) Notice: Subject to any disclaimer, the term of this patent is extended or adjusted under 35 U.S.C. 154(b) by 9 days.

(21) Appl. No.: 15/702,134

(22) Filed: Sep. 12, 2017

(65) Prior Publication Data

US 2018/0079288 A1 Mar. 22, 2018

Related U.S. Application Data

(60) Provisional application No. 62/397,370, filed on Sep. 21, 2016, provisional application No. 62/436,551, filed on Dec. 20, 2016.

(51) Int. Cl.
| B60P 7/02 | (2006.01) |
| B60J 7/10 | (2006.01) |
| B60J 7/19 | (2006.01) |
| B60R 21/13 | (2006.01) |

(52) U.S. Cl.
CPC ............... B60J 7/106 (2013.01); B60J 7/102 (2013.01); B60J 7/194 (2013.01); B60J 7/198 (2013.01); *B60R 21/13* (2013.01)

(58) Field of Classification Search
CPC ... B60J 7/106; B60J 7/102; B60J 7/194; B60J 7/198; B60R 21/13
See application file for complete search history.

(56) References Cited

U.S. PATENT DOCUMENTS

| 4,709,956 A | 12/1987 | Bowman |
| 4,789,197 A | 12/1988 | Lewis |
| 4,799,726 A | 1/1989 | Scott |
| 5,056,855 A | 10/1991 | Moravsky |
| 5,353,826 A | 10/1994 | Davis, Sr. |
| 5,393,114 A | 2/1995 | Christensen |
| 5,443,295 A | 8/1995 | Moberly |
| 5,531,497 A | 7/1996 | Cheng |
| 5,795,011 A | 8/1998 | Flentge |
| 5,951,092 A | 9/1999 | Cissell |
| 6,439,646 B1 | 8/2002 | Cornelius |
| 6,942,275 B2 | 9/2005 | Corbett |
| 7,988,218 B1 | 8/2011 | Devine |
| 8,087,716 B2 | 1/2012 | Kramer |
| 8,783,755 B2 | 7/2014 | Sinkauz |
| 8,814,015 B2 | 8/2014 | Gier |
| 2004/0134953 A1 | 7/2004 | Perez |
| 2006/0012212 A1 | 1/2006 | Moen et al. |
| 2008/0067830 A1 | 3/2008 | Frankham |
| 2010/0288808 A1 | 11/2010 | Marr, Jr. |

(Continued)

*Primary Examiner* — Lori L Lyjak
(74) *Attorney, Agent, or Firm* — Chambliss, Bahner & Stophel, P.C.

(57) ABSTRACT

An apparatus for covering at least a portion of an open bed of a vehicle includes a pair of support frames, where opposing ends of the support frames are removably mounted to opposing edges of the vehicle bed, and a rigid cover panel that is mounted between the support frames to cover the bed. A slot is formed in each support frame that extends along the length of each support frame. The rigid cover panel has edges that may removably slide into the slots of the support frames. The cover panel is held in place by inserting opposite edges into the slots of the support frames and then removably fixing the support frames at a selected location to the vehicle.

19 Claims, 15 Drawing Sheets

(56) References Cited

U.S. PATENT DOCUMENTS

| | | | |
|---|---|---|---|
| 2011/0316302 A1 | 12/2011 | Lenz, Jr. | |
| 2015/0123421 A1* | 5/2015 | Combs, II | B60J 7/198 296/100.02 |
| 2015/0123422 A1* | 5/2015 | Bennett | B60J 7/061 296/136.1 |
| 2015/0314674 A1* | 11/2015 | Bowles | B60R 21/13 280/756 |
| 2016/0046241 A1* | 2/2016 | Crismon | B60J 7/106 224/326 |

\* cited by examiner

MODULAR VEHICLE BED COVER APPARATUS

CROSS-REFERENCE TO RELATED APPLICATIONS

This application claims the benefit of U.S. Provisional Application No. 62/397,370, filed Sep. 21, 2016, and U.S. Provisional Application No. 62/436,551, filed Dec. 20, 2016 both entitled "Modular Vehicle Bed Cover Apparatus," the disclosure of each is incorporated by reference herein in its entirety.

FIELD OF THE INVENTION

The present invention relates to various embodiments of a vehicle bed cover apparatus. More particularly, the invention relates to a customizable modular bed cover for a vehicle bed that may be easily expanded, installed and removed, and fully or partially enclosed.

BACKGROUND

Traditional vehicle bed covers can be difficult to remove and difficult to store once removed. Additionally, bed cover designs, including their sizing and the amount of bed coverage provided, are typically static and there is typically limited, if any, customization of the design available. Vehicle bed covers are also very expensive due to the design and materials used for fabrication. Accordingly, what is needed is vehicle bed cover that is strong and functional while, at the same time, easy to install, remove and store. Additionally, what is needed is a vehicle bed cover that is customizable, including for a variety of bed sizes amount of bed coverage, and less expensive to manufacture than traditional bed covers.

SUMMARY

The above and other needs are met by an apparatus for covering at least a portion of an open bed of a vehicle, where the bed is defined by opposing left and right edges and opposing front and back edges. The apparatus includes a pair of spaced apart parallel support frames and a rigid cover panel that is mounted between the support frames. The cover may be formed using corrugated plastic sheets or other suitably lightweight but rigid materials. Each support frame has opposing ends that are removably mounted to opposing edges of the open bed of the vehicle. A slot is formed in each support frame between an upper slot surface and a lower slot surface that is spaced apart from the upper slot surface. The upper and lower slot surfaces extend along the length of each support frame between the opposing ends thereof. The rigid cover panel has edges that are configured for removable sliding insertion into the slots of the support frames. The cover panel is held in place by inserting opposite edges into the slots of the support frames and then removably fixing the support frames at a selected location to the vehicle. In some embodiments, opposing ends of the support frames are configured to mount to the left and right sides of the vehicle such that the cover panel extends laterally across the open bed when mounted between the support frames. Other orientations are also possible.

The upper slot surface and the lower slot surface may define a profile having two or more flat sections separated by an angled turning section. The cover panel has two or more flat sections joined at an angled turning section. When bent, the cover panel has a profile and that corresponds to the profile of the slot of the support frames so that the cover panel may slide into each of the frames. In certain embodiments, the slot is continuous and the upper and lower slot surfaces each extend, continuously, along the entire length of the slot. However, in other embodiments, the slot is not continuous such that at least one of the upper or lower slot surfaces does not extend, continuously, along the entire length of the slot. The cover may be formed from single continuous piece of cover material having two or more rigid flat sections that are separated by bendable sections such that the cover can form a non-linear profile by being bent at the bendable sections. Based on the type and number of straight and bendable sections of the cover and support frames, the apparatus may be formed as a tonneau-type covering for the open bed or as a camper shell-type covering for the open bed.

In some embodiments, each support frame includes a pair of columns extending upwards from the vehicle, each column having a bottom end configured to removably mount to the vehicle and a top end opposite the bottom end. A crossbar extends between the pair of columns and has left and right ends configured to removably mount to the top ends of the columns. Portions of the slot located on the columns are aligned with a portion of the slot located on the crossbar to form the slot when the crossbar is correctly located and mounted between the columns. Mounting notches are located on a top surface at the top end of each column. Mounting lips extend outwardly from the left and right ends of the crossbar and are configured for insertion into the mounting notches in order to correctly locate the crossbar between the columns. Fasteners extend through the mounting lips and into the mounting notches for attaching the crossbar to the columns.

The above and other needs may also be met by an apparatus for covering a roll cage of a vehicle. The device includes generally a plurality of roll cage mounts that removably mount to bars of the roll cage, a one-piece cover that is positioned on top of the roll cage mounts, and fasteners that pass through the cover and into the cage mount to connect the two together. The cover may have two or more rigid flat sections that are separated by bendable sections. Each of the bendable sections may be formed by a plurality of notches with sides that expand apart when the cover is flat and that contract together when the cover is bent at the bendable sections.

More specifically, each roll cage mount includes a rigid first portion having a lower surface configured to partially encircle a portion of a bar of the roll cage and an upper surface opposite the lower surface. In some embodiments, padding is located on the lower surface of the of the rigid first portion for protecting the bars of the roll cage and for reducing movement of the roll cage mount on the bars. The upper surface of the rigid first portion may include a horizontal top section, a vertical side section, and a curved section joining the top and side sections. In those cases, the cover has two flat sections that are separated by a bendable section. One flat section is configured to mount to the horizontal top section of the rigid first portion, one flat section is configured to mount to the vertical side section, and the bendable section of the cover bends around and covers the curved section of the rigid first portion. The cover includes a plurality of notches with sides that expand apart when the cover is flat and that contract together when the cover is bent at the bendable sections.

An adjustable second portion is fixedly mounted adjacent an outer end of the semicircular lower surface. The second portion is adjustably and releasably mountable to an inner end of the semicircular lower surface. The second portion may be a strap having notches. In that case, the rigid first portion may include a slot disposed on the inner end of the lower surface that is configured to receive the strap and a catch located proximate the slot that is configured to engage the notches of the strap. When the strap is pulled through the slot, the catch engages one of the notches and securely holds the strap through its engagement with the selected notch until the catch is released.

Accordingly, when one side of a roll cage bar is located within the semicircular lower surface, the adjustable second portion may extend from the outer end of the lower surface, over an opposite side of the bar, and then be secured to the inner end of the lower surface to mount the cage mount to the bar.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
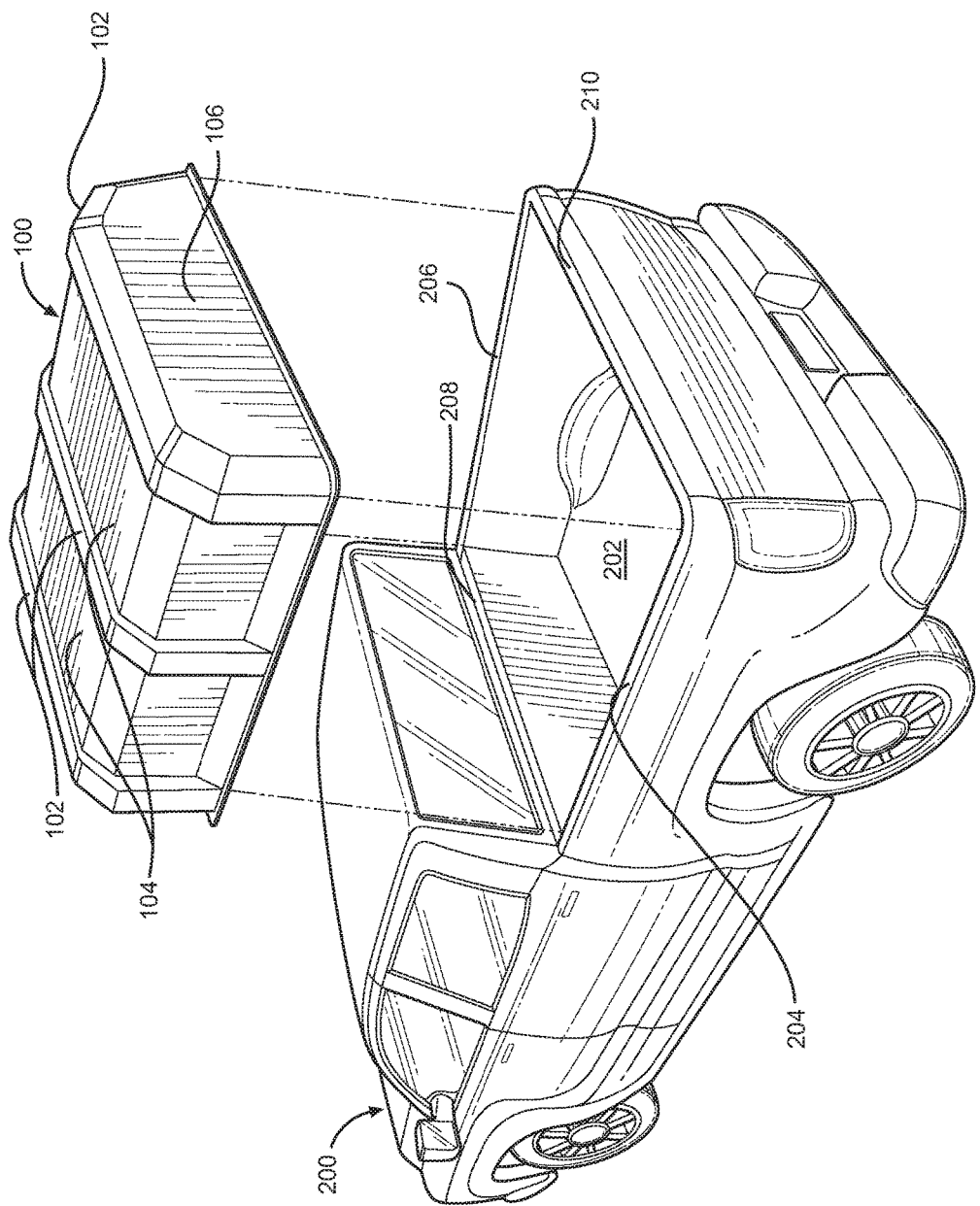
FIG. 1 depicts a modular vehicle bed cover mounted over an open bed of a vehicle according to a first embodiment of the present invention.

Referring now to the drawings in which like reference characters designate like or corresponding characters throughout the several views, there is shown in FIG. 1 a bed cover apparatus 100 for covering at least a portion of an open bed 202 of a vehicle 200. The bed 202 of the vehicle 200 is defined by opposing left and right edges 204, 206 and opposing front and back edges 208, 210. The apparatus 100 includes at least one pair of spaced apart parallel support frames 102 that are mounted to opposing sides of the bed 202 and a rigid cover panel 104 that is removably mounted between each pair of adjacent frames. Additional support frames 102 and cover panels may be added to increase the coverage of the bed 202 by the apparatus 100. Additionally, vertical end panels 106 may be mounted to just one frame 102 and extend down to the vehicle 200 in order to fully enclose the bed 202. Lastly, in some embodiments, the horizontal panels 104 and vertical end panels 106 may be removed altogether and the support frames 102 may be used by themselves to provide a frame-only enclosure. Advantageously, the apparatus 100 may be quickly assembled and disassembled by a single person and can be customized to cover a portion of the vehicle bed or the entire vehicle bed.

Figure 2:
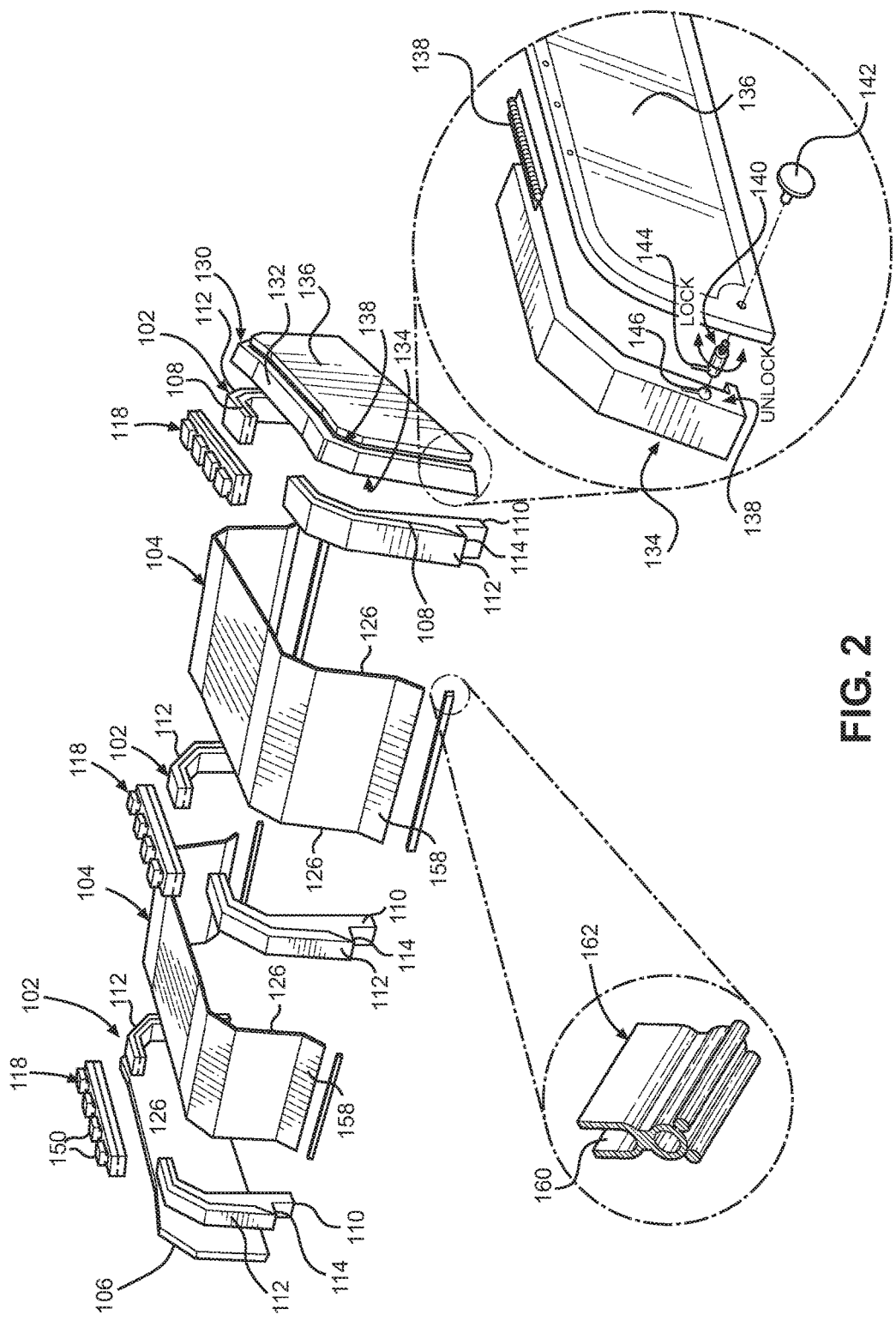
FIGS. 2 and 3 are exploded views depicting the modular vehicle bed cover of FIG. 1.
Figure 3:
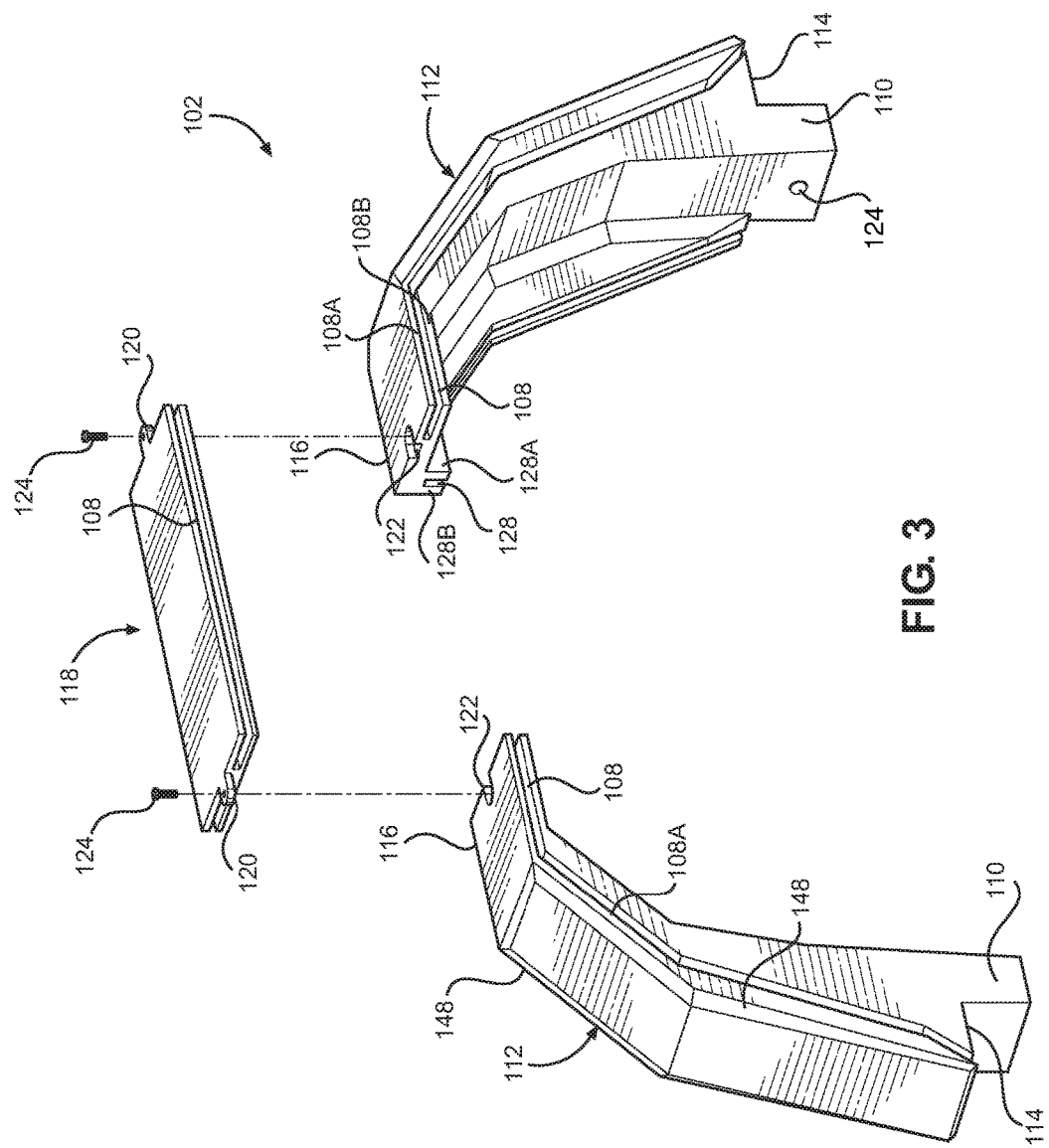

Each of the support frames 102 shown in FIGS. 2 and 3 includes a pair of columns 112 that form a backbone for supporting the cover panels 104 discussed above. The columns 112 are strong so that they can function as a suitable canopy or vehicle bed cover. However, they are also lightweight so that a single person can easily lift and reposition them. Columns 112 may be constructed from a variety of metallic or non-metallic materials. For example, the columns 112 may be formed using aluminum or acrylonitrile butadiene styrene (ABS) plastic. In other embodiments, the columns 112 are formed from plastic, such as blow-molded or injection-molded plastic.

The bottom end of each of the columns 112 includes a tip 110 that extends downwards along the inside edge of the vehicle bed. Fasteners 124, such as marine grade fasteners, may be inserted through openings located in the tip and secured in the edges of the vehicle bed to secure the columns 112 to the vehicle. A bottom surface of the column 112, where the lip joins to column, forms a shelf 114 that may be placed on top of the edges of the vehicle bed and that provides vertical support to the column. The column 112 curves upwards away from the tip 110 and then inwards towards the center of the vehicle bed 202. The upper end 116 of the column 112 is joined to a flat middle section that extends over the center of the vehicle bed 202. In some embodiments, the column 112 has a substantially uniform cross section along its entire length. However, in the embodiment shown in FIG. 3, the column 112 has a narrowing cross section, whereby the region located at the shelf 114 has the largest cross section and the region located adjacent the flat middle section has the smallest cross section.

In some embodiments, the entire support frame 102 is formed as a single component. In those cases, the curved sections of the columns 112 transition directly into the flat middle section without any breaks. However, more preferably and as illustrated, the support frames 102 are formed by several components that may be easily detached from one another. This allows the apparatus 100 to be easily assembled and disassembled by a single user. In those embodiments, the flat middle section is formed as a separate crossbar 118 that is removably mounted between the columns 112. A mounting lip 120 extends outwards from the left and right sides of the crossbar 118. A notch 122 is formed in the top surface of each of the columns 112 that is configured to receive the mounting lips 120. The crossbar 118 is removably mounted between the columns 112 by placing the mounting lips 120 into the notches 122 and then inserting fastener 124 through each of the mounting lips 120 and securing them in openings in the crossbars 112 formed within the notches 122.

Each support frame 102 includes a slot 108 that is formed between an upper slot surface 108A and a lower slot surface 108B extends along its entire length, including along each column 112 and the crossbar 118. The slot 108 is sized and configured so that the edge 126 of a cover panel 104 can be pushed into and be supported by the slot. The slots 108 are located along one or more of the sides of the support frames 102 and are oriented so that cover panels 104 extend between adjacent support frames. When the support frame 102 is formed in multiple separable parts, a section of the slot 108 is formed in each column 112 and the crossbar 118.

Depending on the height and angle of curvature of the columns 112, the cover apparatus 100 may be configured as either a camper or tonneau-type bed cover. The cover apparatus 100 illustrated is provided with tall columns 112 with a very gradual curvature to create a camper type bed cover having substantial storage room above the vehicle bed 202. However, in other cases, by shortening the columns 112 and curving them more sharply a tonnaeau cover may be created, which rises only slightly above the vehicle bed 202. In that case, the column 112 and slot 108 may be bent at up to 90° angles to facilitate a very low profile.

Once the crossbar 118 is mounted to the columns 112 and is correctly aligned, the slot sections 108 are aligned and form a single slot that extends along the length of the support frame 102. Preferably, the slot begins at approximately the top edge 204, 206, 208, 210 of the vehicle bed 202, extends upwards through the center section and then back downwards to approximately the opposite top edge of the vehicle. The slot 108 roughly follows the shape of the support frames 102 and, therefore, curves outwards away from the vehicle bed. This curvature may be formed by straight slot sections connected together at angles. Alternatively, the curvature may be formed as a smooth continuous curve. This outward curvature maximizes the interior storage space, assists in carrying liquids or debris off of the bed cover apparatus 100 and away from the vehicle 200, increases strength and assists in distributing weight downwards to the wide base of the columns 112 and to the vehicle, and minimizes weight and drag. In this embodiment, the slot extends, continuously, along the entire length of each support frame 102 between the opposing ends 106 thereof. Thus, a continuous slot 108 is formed along the entire length of the support frame 102. However, as discussed in later embodiments, a non-continuous slot may also be utilized.

In most cases, each of the support frames 102 is structurally identical so that they are easily interchangeable with one another. For that same reason, slots 108 are preferably located on either side of each support frames 102 for receiving a cover panel 104. This allows a cover panel 104 to be easily secured between two adjacent support frames 102 without requiring any particular orientation of the support frame. This simplifies and speeds the installation and manufacturing processes.

However, in some embodiments, the structure of the support frames 102 may vary based on their positioning within the vehicle bed 202. For example, there may be a structural difference in the support frames 102 depending on its location with respect to other support frames and its position within the vehicle bed 202. For example, end support frames are the outermost support frames that are located at either end of the cover apparatus 100. On the other hand, an intermediate support frame is any support frame located between two end support frames. It should be noted that, in certain cases (i.e., when only one cover panel is utilized), the apparatus may require only end support frames without having any intermediate support columns. The structure of end support frames may differ from intermediate support frames. Since they are located at the ends of the cover apparatus 100, end support frames may include an additional vertical slot 128 that enables an additional vertical end panel 106 to be inserted into the support frame 102 and to extend between the support frame and an edge 204, 206, 208, 210 of the vehicle 200 for enclosing the ends of the cover apparatus 100. In contrast to these "vertical slots" 128 for supporting a vertical cover panel 106, the slots 108 discussed previously are also referred to as "horizontal slots" and are used to support cover panels 104 extending between horizontally spaced apart support frames 102. In addition to supporting vertical panels 106 for enclosing the ends of the cover apparatus 100, the vertical slots 128 may also be used to support divider panels (not shown) that divide one section of the interior space within the cover apparatus 100 from another section of interior space. In that case, a divider panel, which is structurally similar to the vertical end panels, extends from the support frame 102, past the edges 204, 206, 208, 210 of the vehicle 200, and to the vehicle bed 202 itself. The vertical slots 128 are created in a very similar manner as the horizontal slots, because they are formed between parallel first and second slot surfaces 128A, 128B that extend downwardly from support frame 101. The vertical slot 128 may be provided in place of one of the horizontal slots discussed previously or may be provided in addition to those slots discussed above. Accordingly, the first and second slot surfaces that form the vertical slot may be located on either the leading or trailing end of the support frame or may be positioned between the leading and trailing ends. Alternatively, a support frame 102 may be provided with horizontal slots 108 on its front-facing and rear-facing surfaces and a vertical slot 128 on its bottom surface.

The locking enclosure end 130 (also referred to herein as a "locking enclosure frame") shown in FIG. 2 is another option for enclosing an end of the cover apparatus 100 that may be used as an alternative to the support frames with vertical slots discussed previously. The locking enclosure frame 130 includes a frame 132 having a first edge 134 that is configured to be inserted into an outward-facing horizontal slot 108 of an end support frame 102. A window 136 is mounted to a second edge of the locking enclosure frame 130 via a hinge 138 that mounts the top of the window to the inside surface of the frame. A rotating lock 140 has a handle portion 142 that passes through the window and mounts to a lock portion 144. When the window is closed, the lock portion is inserted into a lock opening 146 that is formed in the locking enclosure frame 130. Turning the lock 140 via the handle portion 142 in one direction causes the lock portion 144 to be rotated to the locked position within the locking enclosure frame 130, where the window 136 is prevented from opening. Turning the lock 140 via the handle portion 142 in the opposite direction causes the lock portion 144 to be rotated to the unlocked position to enable the window 136 to be opened.

Additional features of the support frames 102 and locking enclosure frame 130 may include rounded or chamfered leading and trailing edges 148, which assists in directing airflow over the frame to reduce drag. In some embodiments, a mounting track 150, such as a picatinny rail, or other utility-type rack may be formed or mounted to the top of the support frames 102 or across multiple support frames.

In the embodiment shown, a picatinny rail is integrally formed as part of the top surface of the crossbar 118.

Figure 4:
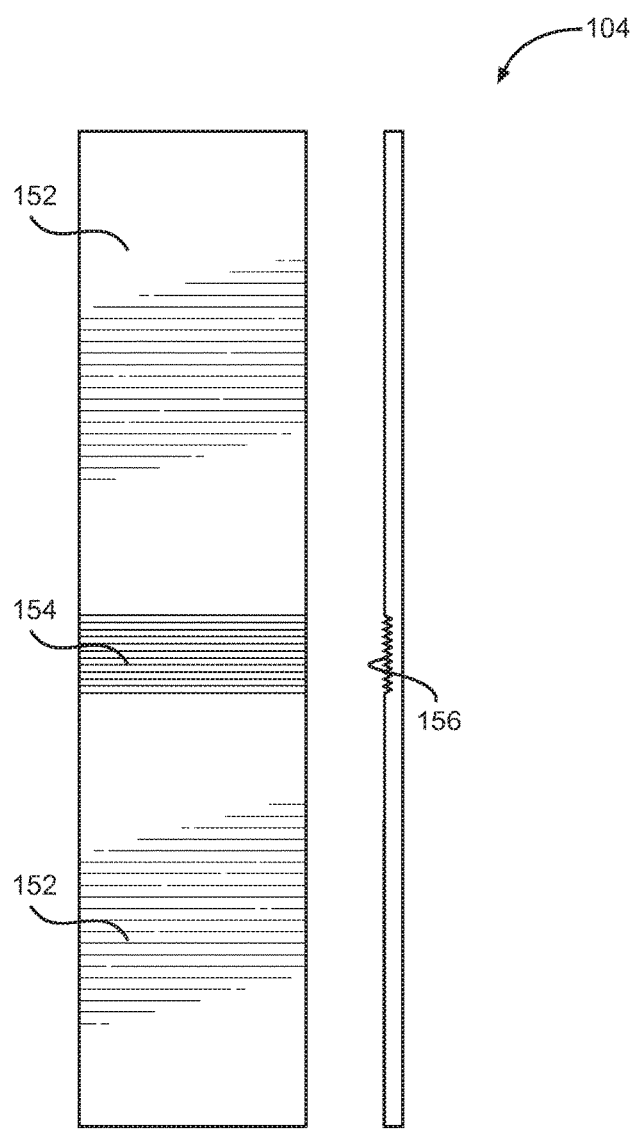
FIG. 4 is a cover shown in a flat configuration and including a pair of flat sections separated by a bendable section.

As discussed above, rigid panels 104, 106 may removably mounted within the slots, including horizontally between adjacent support columns 102 and vertically at ends of the cover apparatus 100 or as dividers along the length of the cover apparatus. The panels 104, 106 are formed using a lightweight but strong material, such as corrugated plastic sheets, and they may be transparent or partially or completely opaque. Preferably, each of the panels 104, 106 are formed as a single continuous piece of cover material in order to simplify the installation and manufacturing processes. Forming the panels 104, 106 as a single cover instead of multiple covers also assists in preventing moisture and debris from entering the enclosed area of the vehicle bed 202. Depending on their location, certain panels 104 are designed to transition between an unbent (i.e., flat) configuration to a bent configuration in order to fit into the slots 108 provided in the support frames. As shown in FIG. 2 and FIG. 4, these bendable panels 104 include two or more rigid flat 152 sections that are separated by bendable sections 154. Notches 156 are located at each of the bendable sections 154, which notches collapse and enable the panels 104 to be bent such that the cover panel can form a non-linear profile and fit into the slots 108 of the support frames 102.

In many cases, the bendable sections 154 are located on the inside surface of the panel 104 to enable the panel to be bent inwards, such that it arcs upwards and inwards towards the center of the vehicle bed. However, in some cases, the bendable sections 154 are located on the outside portion of the panel 104 to enable the panel to be bent outwards. The lower ends of the panel 104 may be bent outwards, for example, to provide a "kick out" section 158 that juts abruptly outwards near the lower edge of the panel. The kick out 158 may be used to further assist in directing liquids away from the enclosure 100 and the vehicle bed 202. In certain embodiments, the bottom end of the horizontal panel, including or not including the kick out 158, is received in a slot 160 located in a gasket 162 that extends along the length of the bed that directs water over the side of the vehicle. In some embodiments, bendable sections 154 are located at corresponding locations on both the inside and outside surfaces of the panel 104 so that the panel can be bent into the desired shape (i.e., inwards or outwards) without requiring any particular orientation.

Figure 5A:
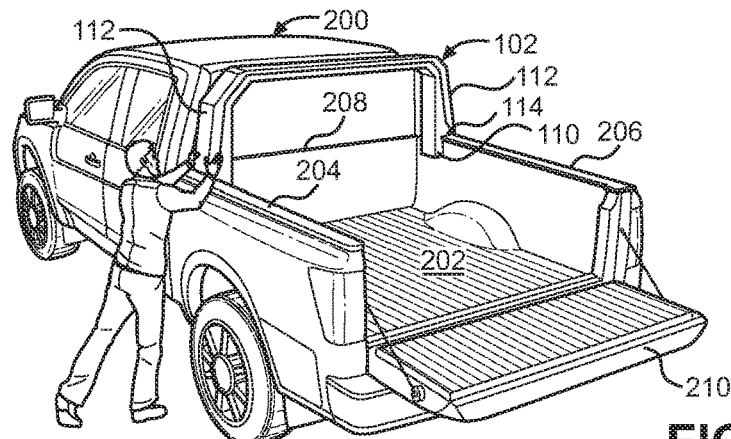
FIGS. 5A-5F are perspective views depicting a sequence of steps for mounting the modular vehicle of FIG. 1 to an open bed of a vehicle.

With reference to FIG. 3 and FIG. 5A, to install the support frame 102, columns 112 are first mounted are corresponding locations on opposing edges (204 and 206 or 208 and 210) of the vehicle 200. Each column 112 is mounted to the bed by inserting the lip 110 into the bed alongside the inside edge of the bed and then the shelf 114 is placed on top of the edge of the bed. The lip 110 is then joined to the edge of the vehicle bed at the selected location.

In this particular case, support frames 102 are mounted to the left and right sides 204, 206 of the vehicle bed 202, such that the support frames 102 and cover panels 104 extend laterally over the open vehicle bed 202. This orientation is preferable because it facilitates fast and easy installation and removal by a single person. However, in other cases, the frames 102 may be mounted to the front and back edges 208, 210 of the bed 202, such that the support frames 102 and cover panels 104 extend longitudinally along the length of the bed. By moving the mounting locations for the ends of the support frames 102, the bed cover apparatus 100 may be re-oriented in different directions. The ends of the columns may be fixedly positioned at any location along any of the edges of the bed 202 of the vehicle 200. This allows the support frames 102 to be relocated as desired and for the apparatus, as a whole, to be relocated as desired. This also allows for cover panels 104 having different widths to be positioned within the support frames 102 in order to create a custom sized cover for the vehicle bed 202. For example, if desired, two support frames 102 may be used with a single suitably sized cover panel 104 to cover the entire vehicle bed 202. Alternatively, a bed cover 100 that covers less than the entire vehicle bed 202 may be used to cover a front portion, a back portion, or an intermediate portion of the vehicle bed 202. Additionally, this would enable the bed cover apparatus 100 to fit vehicle beds of varying lengths or widths.

Next, the crossbar 118 is mounted between the columns 112 by lowering the left and right lips 120 into corresponding notches 122 of the columns. By adjusting the length of the crossbar 118, the overall width of the support frame 102 may be varied, which would enable the bed cover apparatus 100 to fit vehicle beds of varying lengths or widths. Finally, fasteners 124 are inserted through the lips 120 and mounted into the columns 112. This method for connecting the crossbar 118 to the columns 112 and the columns to the vehicle bed 202 provides a very secure connection that also allows the support frame 102 to be easily disassembled. Additionally, this connection method ensures that the crossbar 118 is consistently and correctly located with respect to the columns 112, including side-to-side alignment, front-to-back alignment, and vertical alignment. After the crossbar 118 has been installed, an inverted U-shaped frame is formed that extends upwards and over the vehicle bed 202.

The support frames 102 may be used either with the panels 104, 106 (enclosed configuration) or without the panels (open frame or frame only configuration). A benefit of the open frame configuration is that it permits large items to be carried in the vehicle bed 202 without removing the entire cover apparatus 100. Additionally, the support frames 102 may be used without the cover panels 104, 106 as a utility rack. For example, as discussed above, the support frames 102 may include integrated mounting locations 150 that enable large items to be strapped across the frames. The frames 102 may also have connectors that allow for a separate rack to be removably mounted onto and above the columns. This may be useful for example, in transporting large items such as kayaks, bicycles, luggage, etc. In those cases where only the support frames 102 are required, additional support frames may be placed into the vehicle bed at selected locations and the installation process would be complete after following the steps outline above.

Figure 5B:
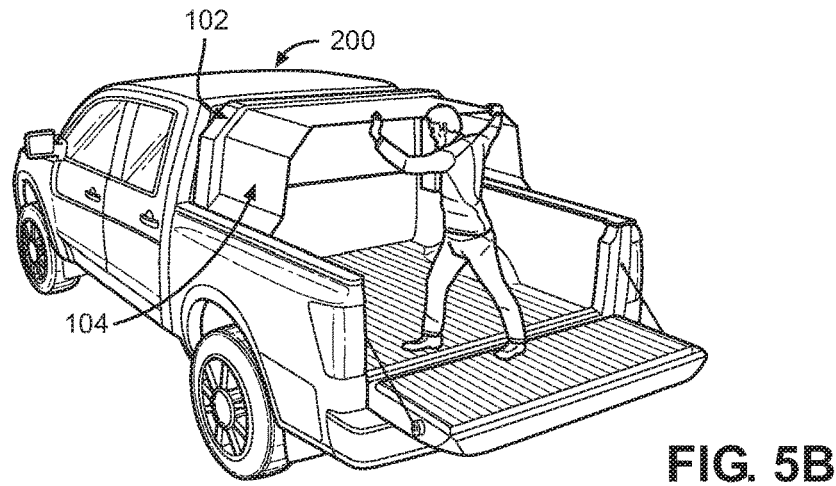
Figure 5C:
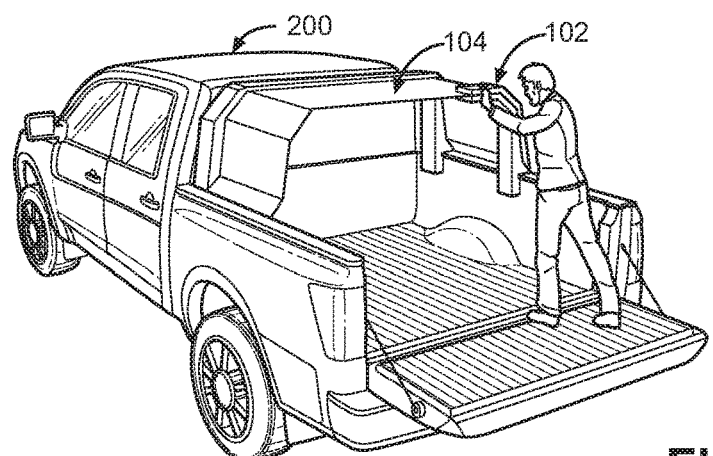
Figure 5D:
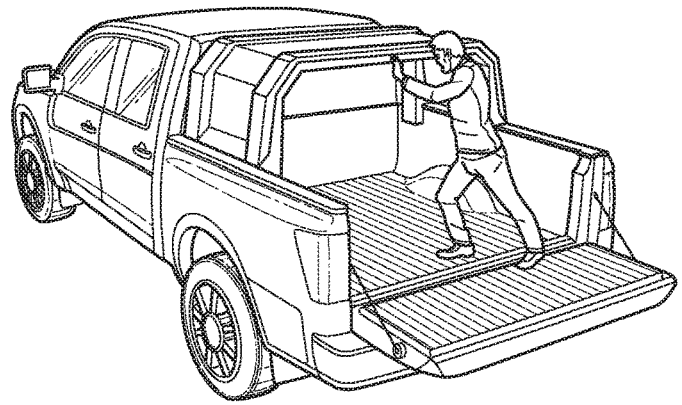

However, as illustrated in FIGS. 5B-5F, when the support frames 102 are combined with the rigid panels 104, the vehicle bed 202 may be fully enclosed or partially enclosed. A benefit of this apparatus 100 is that it is customizable and can fit any length or width of open vehicle bed 202. The amount of coverage offered by the apparatus 100 depends on the number of support frames 102 and the number and size of the panels 104, 106 used. To form an enclosure, a minimum of two support frames 102 are required to be placed onto the vehicle bed 202. The first support frame 102 is installed at the desired location on the vehicle bed (FIG. 5A), as discussed above. As an optional step, a vertical panel 106 (FIG. 2) may be inserted into the vertical slot 128 (FIG. 3) to enclose the end of the cover apparatus 100 near the passenger compartment of the vehicle 200. Next, a cover panel 104 is bent at the bendable sections to conform to the shape of the slot in the first panel mounted to the vehicle. An edge of the panel is then inserted into the slot of the support frame (FIG. 5B). Lastly, a second support frame 102 is constructed and is slid into position next to the panel 104 so that the opposite edge of the panel is inserted into the slot of the second support frame (FIGS. 5C and 5D). Pushing the second support frame 102 towards the first frame secures the cover panel 104 in place between the two support frames. The second support frame 102 may then be secured to the vehicle 200. As an optional step, gaskets 162 (FIG. 2) may be installed to the vehicle 200 after installing the first support frame 102 and before installing the cover panel 104. The ends of the cover panel 104 slide into the gasket 162 and then the sides of the panel 126 slide into the first support frame 102.

Figure 5E:
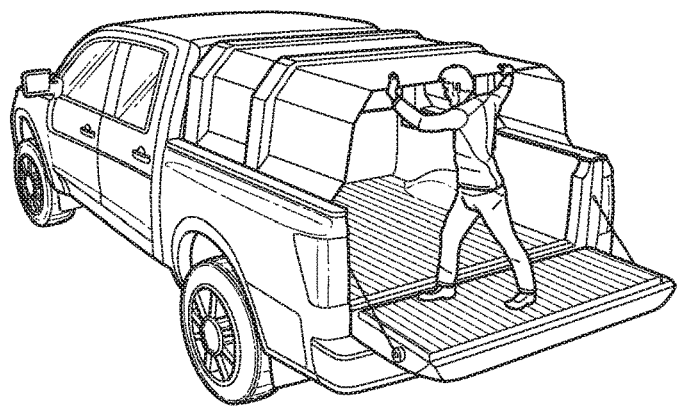
Figure 5F:
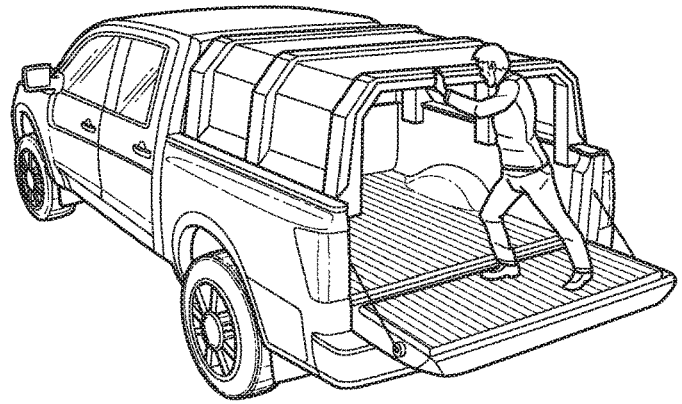
Figure 6:
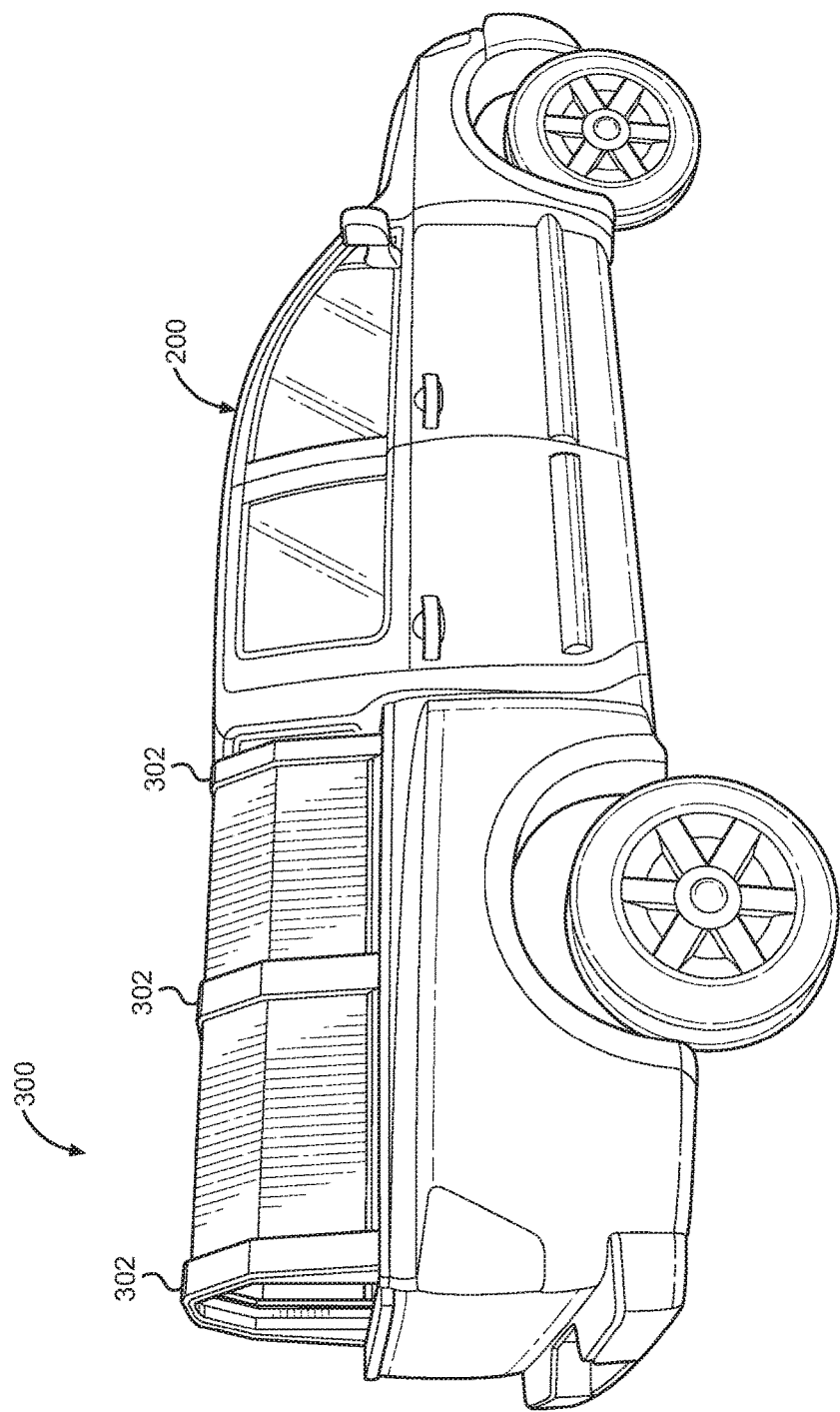
FIG. 6 depicts a column for a modular vehicle bed cover mounted over an open bed of a vehicle according to a second embodiment of the present invention.
Figure 7:
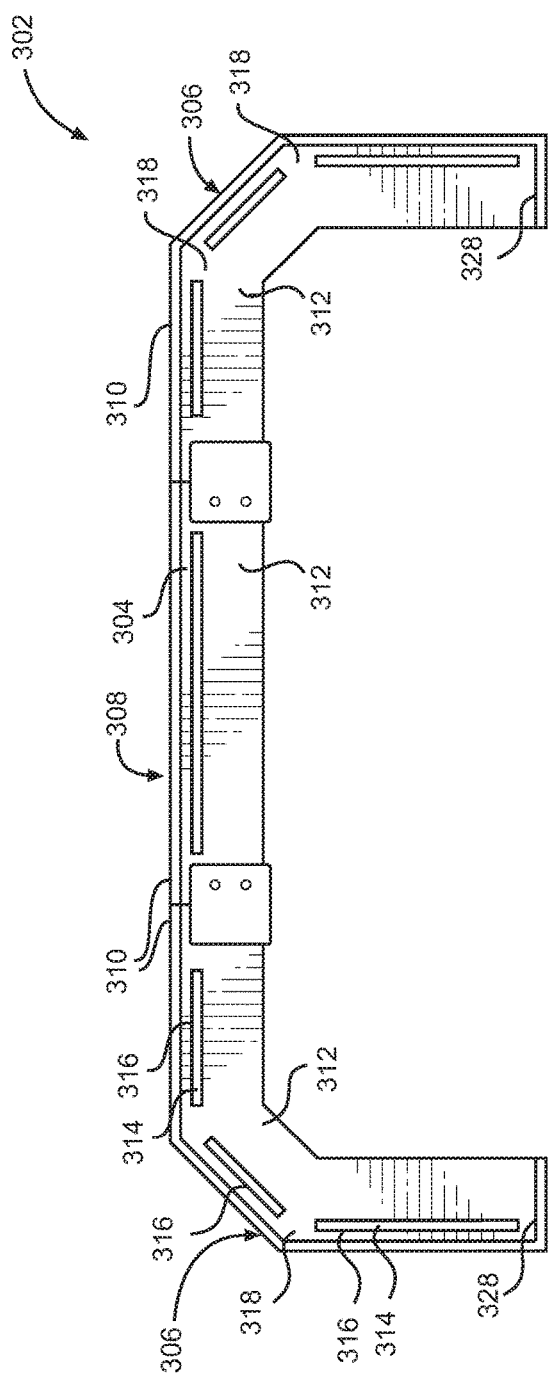
FIG. 7 depicts an exterior surface of a modular vehicle bed cover utilizing several of the columns shown in FIG. 6 with panels removably mounted between the columns.
Figure 8:
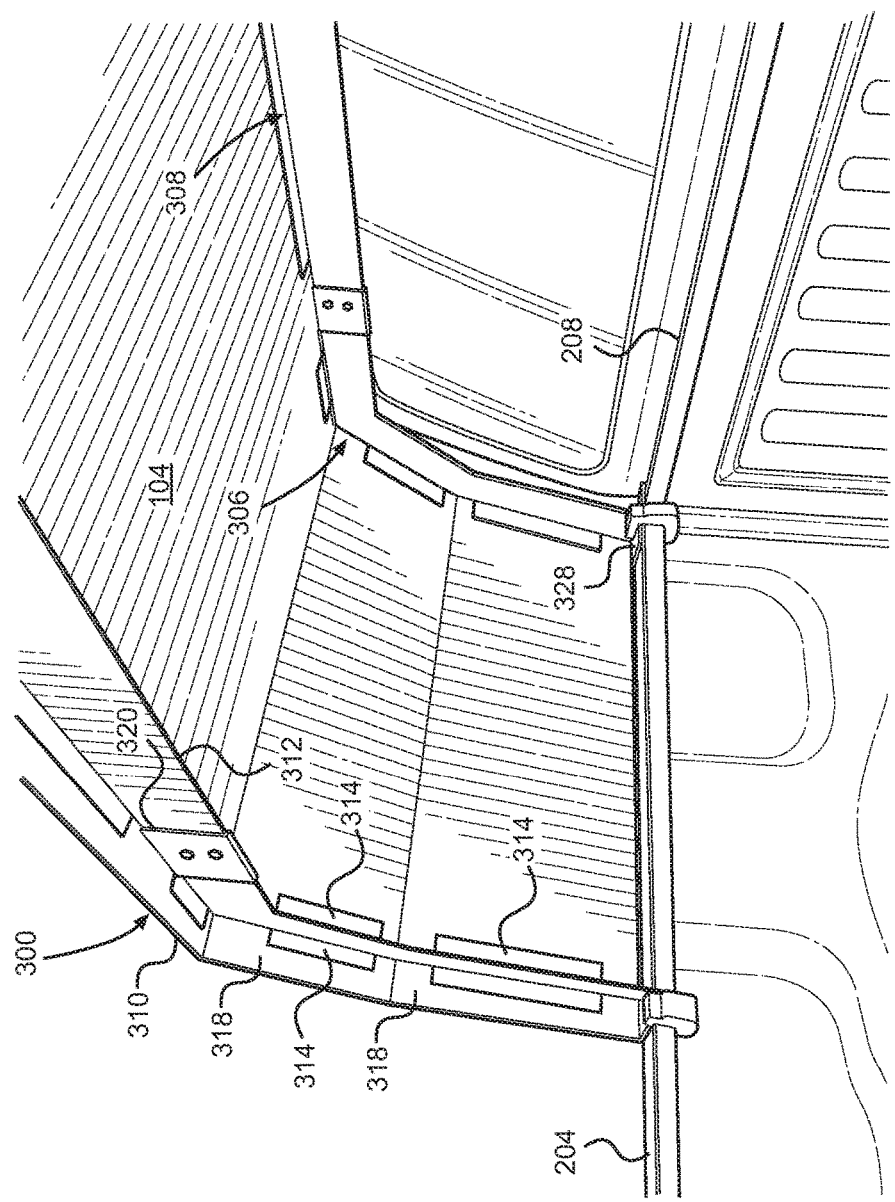
FIG. 8 depicts an interior surface of a modular vehicle bed cover utilizing several of the columns shown in FIG. 6 mounted to a vehicle and with panels removably mounted between the columns.
Figure 9:
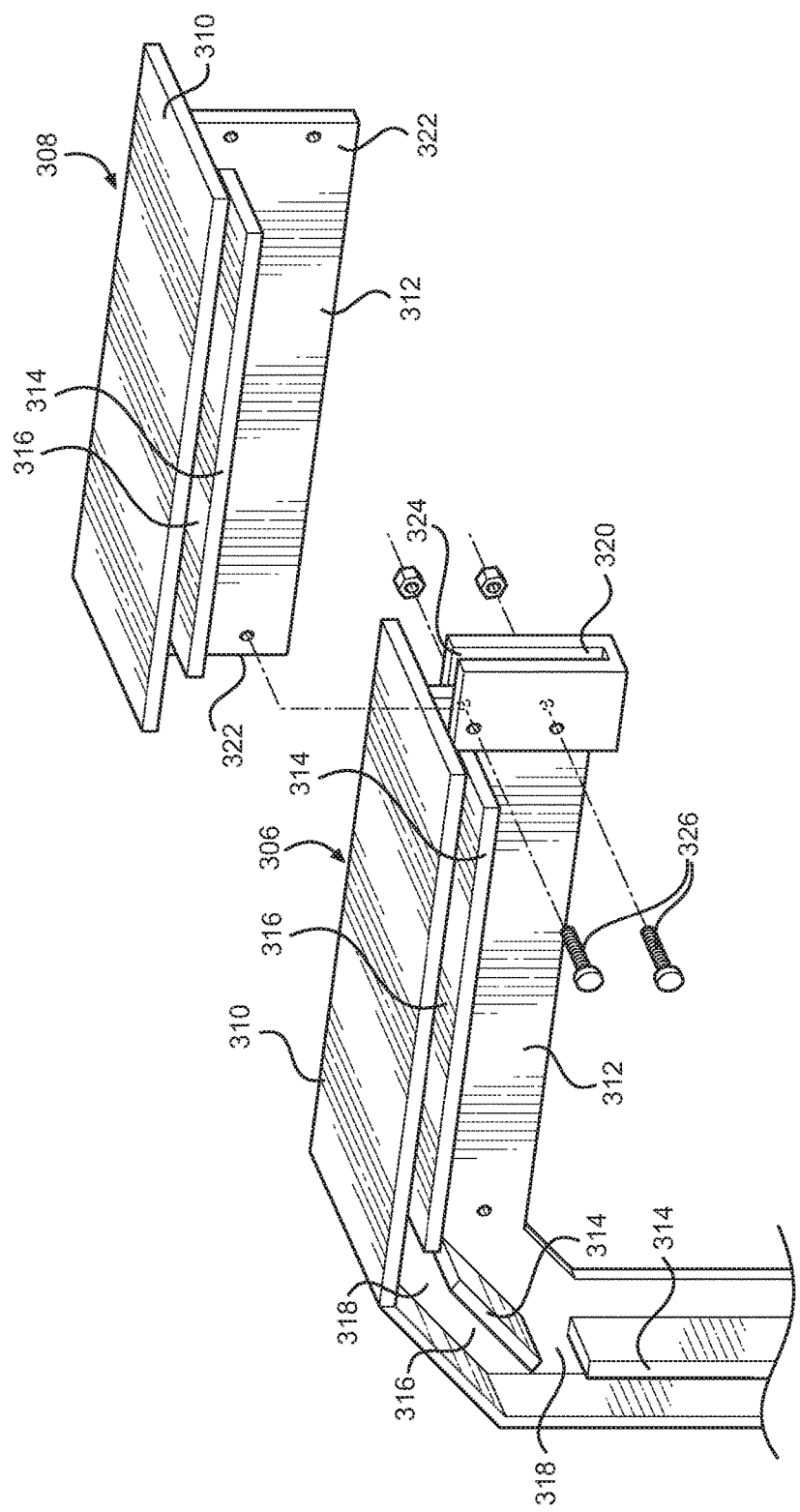
FIG. 9 is an exploded view depicting a crossbar being mounted to a column.

When only two support frames 102 are used, each support frame is an end support frames and no intermediate support frames (i.e., support frames located between end support frames) would be used. A horizontal panel 104 would be placed into the horizontal slots 108 of the end support frames. The enclosure may be extended by inserting an intermediate support frame 102 between the two end support frames. In that case, panels 104 are placed between the intermediate support frame 102 and each end support frame. Additional intermediate support frames 102 and panels 104 may be added to further expand the enclosure 100, as shown in FIGS. 5E and 5F. As with the initial end support frame discussed above, a vertical panel 106 (FIG. 2) may also be placed into the opposite end support frame 102 to enclose both ends of the cover apparatus 100. Alternatively, a locking enclosure 130 (FIG. 2) may be mounted to the end support frame 102 in the manner discussed previously in order to enclose the end of the cover apparatus 100.

With reference to FIGS. 6-9, an alternative embodiment of the bed cover apparatus 300 is provided. The shape and function of this bed cover apparatus 300 is substantially similar to the apparatus 100 discussed above because it, too, provides a series of support frames 302 having a slot 304 for receiving cover panels 104 for covering a vehicle bed. As discussed below, the main differences relate to how the slots 304 are formed and also how columns 306 and crossbar 308 that form the support frames 302 are mounted together.

As in the previous case, this support frame 302 includes a pair of columns 306 that form a backbone for supporting the cover panels 104. The columns 306 curve upwards and then inwards towards the center of the vehicle bed. The upper end of each of the columns 306 is joined to a flat middle section that extends over the center of the vehicle bed. In this case, the outer profile of the support frames is defined by a horizontal top plate 310. A vertical ridge 312 is mounted underneath and extends downwards from the top plate 310. Next, one or more ledges 314 are mounted to the vertical ridge 312 and extend outwards in a direction parallel with the top plate 310. A slot section 316 is formed between the ledges 314 and the top plate 310. The slot sections 316, in combination, form the slot 304. Depending on its mounting location, the vertical ridge 312 may be positioned in the middle or along one side or the other of the top plate 310. If positioned in the middle, portions of the top plate 310 extend in both directions away from that vertical ridge 312. In those cases, ledges 314 may also extend outwards from both sides of the vertical ridge 312 in order to form slot sections 316 on either side of the vertical ridge. The apparatus 300 includes at least one pair of spaced apart parallel support frames 302 that are mounted to opposing sides of the bed of the vehicle and a rigid cover panel 104 that is removably mounted between each pair of adjacent support frames. Additional support frames 302 and cover panels 104 may be added to increase the coverage of the bed by the apparatus 300. The slot sections 316 formed between the top plate 310 and the ledges 314 are configured to receive the rigid panel sections 104 discussed above. However, unlike the slot discussed previously, the slot 304 formed in this case is discontinuous and is made up by a number of slot sections 314 separated by gaps that work together to guide and hold the panel sections. The discontinuity provided by the gaps 318 between slot sections 316 in this case is important because it facilitates the insertion of the cover panel 104 into the slot 304.

The entire support frame 302 may be formed as a single component. However, more preferably, the support frames are formed by two vertical columns 306 that extend upwards and inwards and whose top ends are joined together by a removable crossbar. As shown best in FIG. 9, a U-shaped support 320 is mounted at the ends of each column 306. The left and right ends 322 of the vertical ridge 312 of the crossbar 308 are configured to slide down through a top opening 324 in the U-shaped support 320. The vertical ridge 312 is mounted in the U-shaped support 320 by fasteners 326. By mounting the crossbar 308 to the vertical column 306 in this manner, the slot sections 316 of the support frame 302 are automatically aligned with one another to enable the rigid panels 104 to be inserted into the support frame 302. The bottom ends of the vertical columns 306 may include mounting plates 328, which enable opposing ends of the support frame 302 to be clamped to the edge of the vehicle bed in order to fix it in place.

Figure 10A:
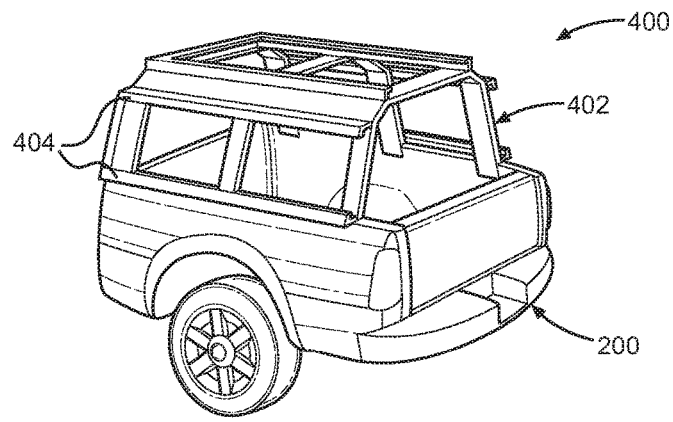
FIGS. 10A-10C are perspective views depicting a sequence of steps for mounting a modular vehicle bed cover over an open bed of a vehicle according to a third embodiment of the present invention.
Figure 10B:
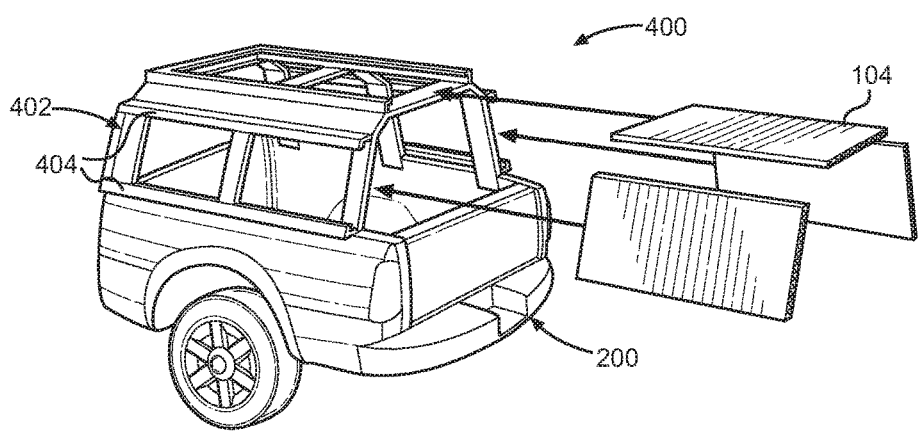
Figure 10C:
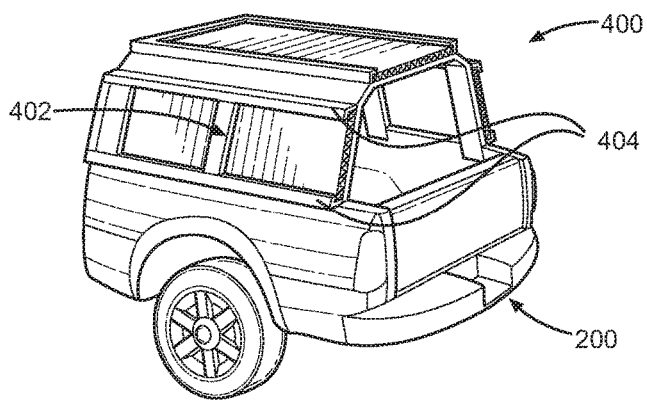

In FIGS. 10A-10C, an alternative apparatus 400 for installing the rigid panels 104 discussed above to a support frame 402 is disclosed. In this case, pairs of L-shaped guides 404 are mounted in spaced apart relation to one another and form a slot between them that is configured to receive the rigid panels. This installation method is slightly different from the previously described methods where the panels were installed and secured in place in slots by sliding adjacent support frames together. In this case, the support frames 402 remain stationary and the panels are simply inserted into the slot formed by the L-shaped guides 404. In this particular embodiment, the guides 404 are located on the exterior surface of the support frames 4-2, including on the left and right sides of the apparatus 400 as well as on the top. However, the slots 404 could also be formed on the inside surface of the support frames 402. Additionally, the slots may be continuous, as illustrated, or they may be discontinuous, such that there are breaks provided in the slot between each of the support frames 402.

Figure 11:
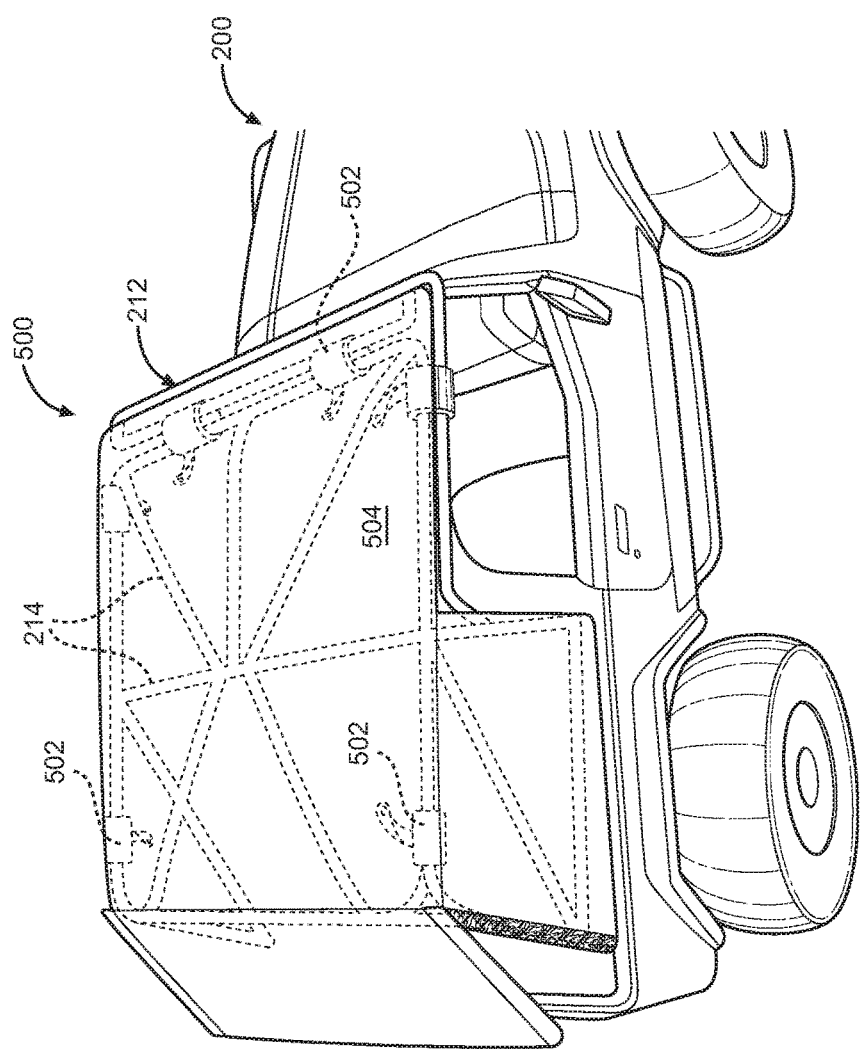
FIG. 11 depicts a modular vehicle bed cover mounted over an open bed of a vehicle using a plurality of roll cage mounts.

In FIG. 11, an apparatus 500 for covering a roll cage 212 of a vehicle 200 is illustrated. The roll cage 212 includes a number of rigid bars 214 that are arranged to cover or enclose a portion of a vehicle. In this particular case, roll cage bars 214 enclose the passenger section of the vehicle 200 as well as the rear cargo area of the vehicle. The rear cargo area could include the vehicle bed shown in earlier figures and discussed above. Accordingly, this apparatus 500 for covering a roll cage 212 could be used in conjunction with the support frames discussed previously. The apparatus 500 includes a plurality of roll cage mounts 502 that may be removably mounted to the roll cage bars 212. A one-piece cover 504, similar in construction to the panel 104 discussed previously, is then placed over the roll cage mounts 502 and then removably mounted to the roll cage mounts with fasteners. Thus, the apparatus 500 provides an easily removable custom cover for a vehicle 200.

Figure 12:
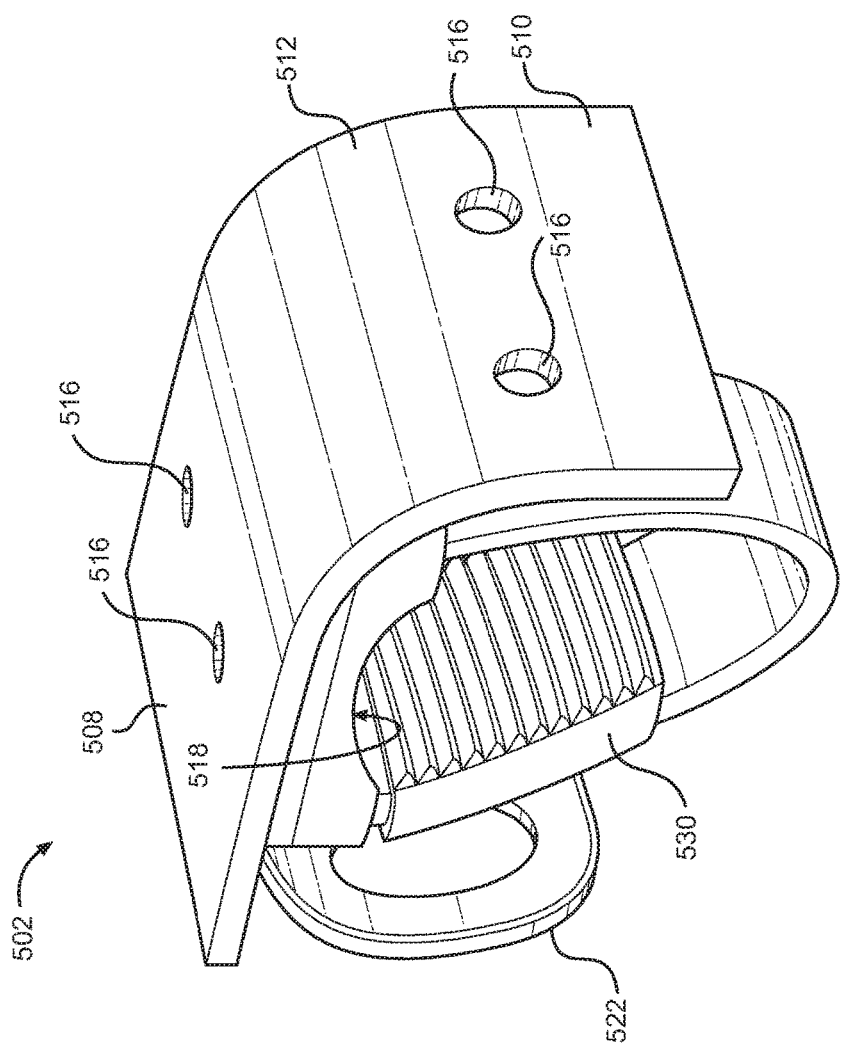
FIG. 12 is a perspective view of a roll cage mount according to an embodiment of the present invention.

As shown best in FIG. 12, the roll cage mounts 502 include a rigid first portion 506 having a curved rigid upper surface having a horizontal flat portion 508, a vertical flat portion 510, and a curved section 512 connecting the horizontal and vertical flat portions. When the roll cage mounts 502 are arranged as shown in FIG. 11, the horizontal flat portion 508 of the upper surface is pointed across the top of the vehicle 200, the curved section 512 passes around the roll bar 214, and the vertical flat portion 510 of the upper surface is pointed down along the side of the vehicle. The cover 504 is positioned on top of the rigid first portion and then mounted into the upper surface 508, 510, 512 with fasteners 514 that are secured in fastener openings 516. Thus, the rigid first portion provides support to both the top and side portions of the cover 504 once it is secured onto the vehicle 200.

The rigid first portion has a semicircular lower surface 518 that partially encircles the roll cage bars 214. Preferably, the left and right sides of the semicircular lower surface 518 extend downwards such that they are located on either side of the roll cage bar 214. These left and right sections assist in limiting the side to side movement of the roll cage mount 502 after it is placed onto the roll cage bar 214. Padding 520 may be provided within the semicircular lower surface 518 to provide a better fit with the roll cage bar 214 and also to further reduce movement between the roll cage bar and the roll cage mount 502.

To fully secure the roll cage mount 502 to the roll cage bars 214, an adjustable second portion of the roll cage mount surrounds the lower portion of the roll cage bar (i.e., the portion that is not covered by the rigid first portion). The adjustable second portion includes a strap 522 that is fixedly mounted, at one end, to the rigid first portion. The free end of the strap 522 passes around the roll cage bar 214 is releasably secured to rigid first portion. Preferably, the strap 522 is arranged so that it is easily connected and disconnected by a user located inside of the vehicle. To that end, the strap 522 is preferably fixedly mounted adjacent the vertical flat portion 510 of the rigid first portion along the outside of the vehicle and releasably mounted adjacent the horizontal flat portion 508 of the rigid first portion along the inside of the vehicle. In the version shown, the strap 522 is fixedly mounted to the right downward extension of the rigid first portion and is removably mounted to the left downward extension of the rigid first portion. A variety of well-known releasable mounting methods could be used to mount the strap 522 to the roll cage mount 502. For example, snaps, buttons, clasps, etc. are all suitable methods for mounting the strap 522 to the roll cage mount 502. In this particular case, a strap similar to an adjustable handlebar strap (e.g., Arkon® brand bike handlebar strap, Model No. GP234) is used. Accordingly, in certain embodiments, the adjustable second portion includes a strap having notches, ridges, holes, frictional surface or other surface feature capable of being grasped and securely held until released (collectively "notches 524"). The rigid first portion may comprises slot 526 that is configured to receive the strap 522. A catch (not shown) located proximate the slot 526 is configured to engage the notches 524 of the strap 522. When the strap 522 is pulled through the slot 526 the catch engages one of the notches 524 and securely holds the strap through its engagement with the selected notch until the catch is released by a lock release 528 which disengages the catch from the notch. Lastly, additional padding 530 may be provided between the strap 522 and the roll cage bar 214 to further assist in correctly sizing the strap to the roll cage bar and to prevent excess movement. For example, a removable padding sleeve 530 is mounted over the strap 522 and contacts the roll cage bar 214 when the strap is secured around the roll cage bar.

Figure 13:
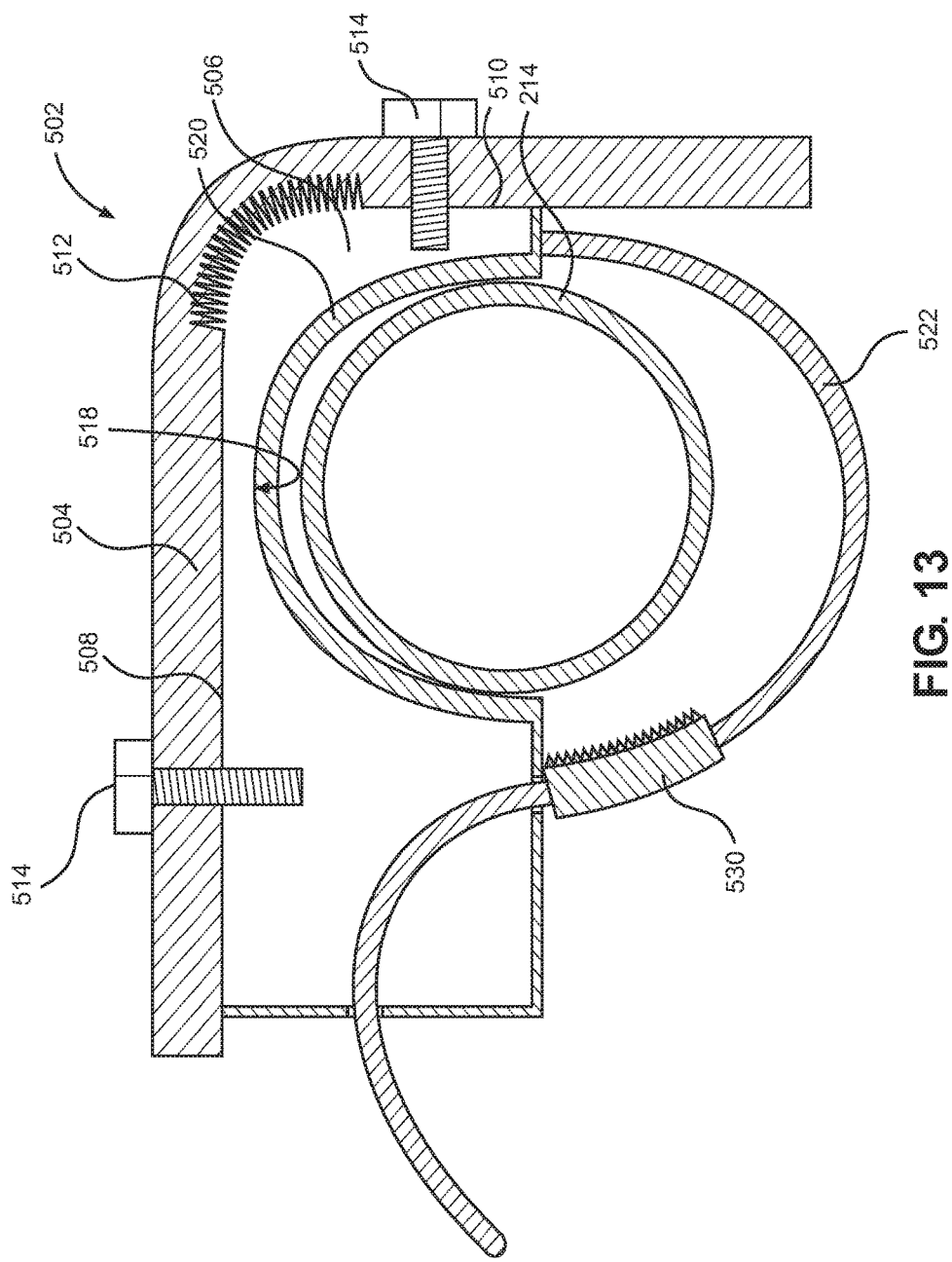
FIG. 13 is an elevation view of a cover in a bent configuration mounted to a roll cage mount.
Figure 14:
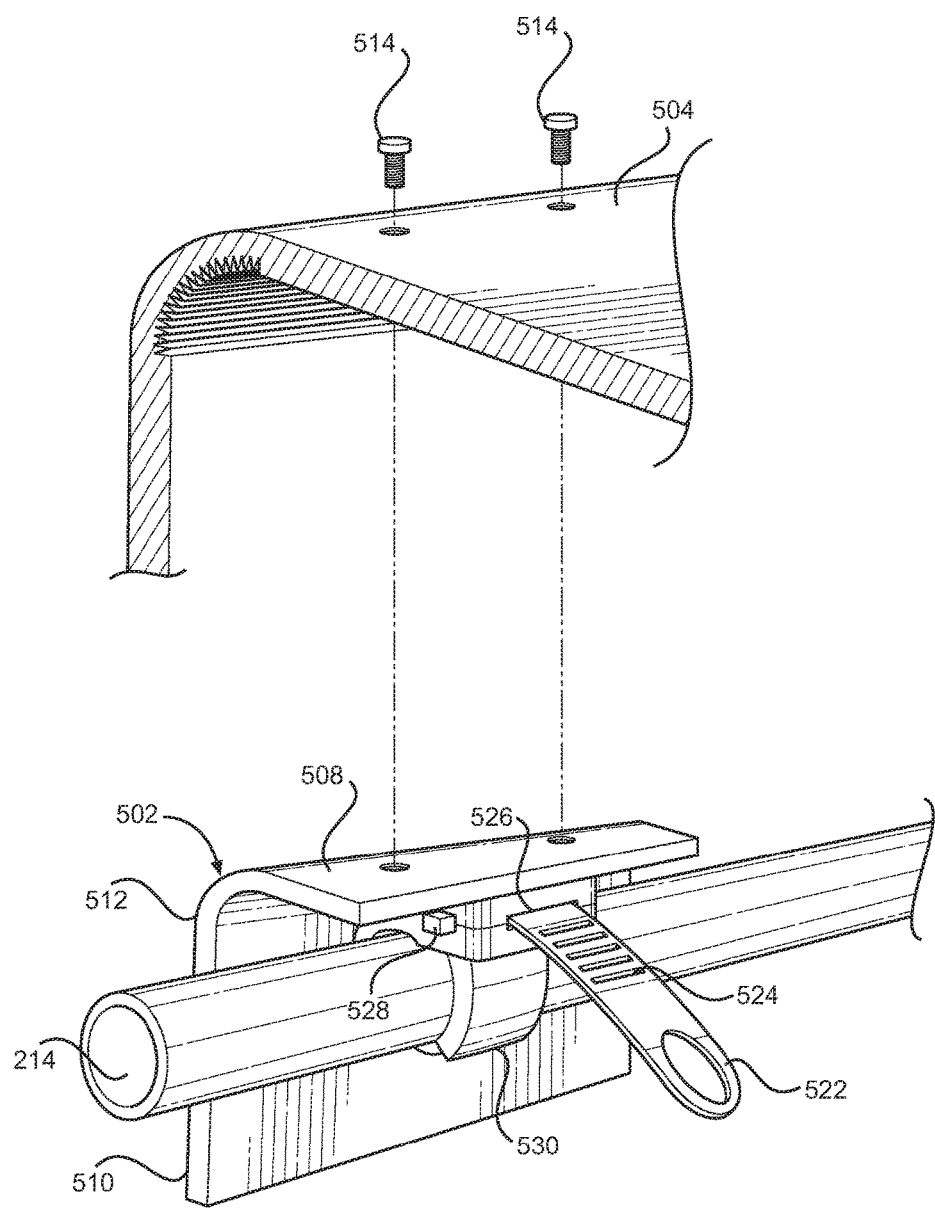
FIG. 14 is an exploded view of the cover and roll cage mount of FIG. 13.

As shown in FIGS. 13 and 14, after the roll cage mount 502 has been secured to a roll cage bar 214, a cover panel 504 is lowered down onto the upper surface of the rigid first portion of the mount. Flat portions of the cover 504 are placed onto the flat horizontal and vertical portions of the upper surface 508, 510 and the bendable section is positioned over the curved section 512. Fasteners 514 pass through the cover panel 504 and into the mount 502. Removing the panel 504 from the vehicle 200 can be accomplished easily by simply detaching the mounts 502 from the roll cage bars 214. The mounts 502 remain securely fixed to the cover panel 504 and at the proper location. This allows the cover 504 to be easily and reliably installed and removed.

The foregoing description of preferred embodiments for this disclosure have been presented for purposes of illustration and description. They are not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the invention in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An apparatus for covering at least a portion of an open bed of a vehicle, the bed defined by opposing left and right edges and opposing front and back edges, the apparatus comprising:
   a pair of spaced apart parallel support frames, each support frame having opposing ends removably mounted to opposing edges of the open bed;
   a slot formed in each support frame between an upper slot surface and a lower slot surface that is spaced apart from the upper slot surface, the upper and lower slot surfaces extending along the length of each support frame between the opposing ends thereof; and
   a rigid cover panel having edges configured for removable sliding insertion into the slots of the support frames so that the cover panel is held in place by inserting opposite edges into the slots of the support frames and then removably fixing the support frames at a selected location to the vehicle.

2. The apparatus of claim 1 wherein the upper slot surface and the lower slot surface define a profile having two or more flat sections separated by an angled turning section and wherein the cover panel has a profile defined by two or more flat sections joined at an angled turning section and that corresponds to the profile of the slot of the support frames so that the cover panel may slide into each of the frames.

3. The apparatus of claim 1 wherein the slot is continuous and the upper and lower slot surfaces each extend, continuously, along the entire length of the slot.

4. The apparatus of claim 1 wherein the slot is not continuous such that at least one of the upper or lower slot surfaces does not extend, continuously, along the entire length of the slot.

5. The apparatus of claim 1 wherein the cover comprises single continuous piece of cover material having two or more rigid flat sections that are separated by bendable sections such that the cover can form a non-linear profile by being bent at the bendable sections.

6. The apparatus of claim 1 wherein the apparatus is a tonneau-type covering for the open bed.

7. The apparatus of claim 1 wherein the apparatus is a camper shell-type covering for the open bed.

8. The apparatus of claim 1 wherein each support frame further comprises:
- a pair of columns extending upwards from the vehicle, each column having a bottom end configured to removably mount to the vehicle and a top end opposite the bottom end; and
- a crossbar extending between the pair of columns and having left and right ends configured to removably mount to the top ends of the columns,
- wherein portions of the slot located on the columns are aligned with a portion of the slot located on the crossbar to form the slot when the crossbar is correctly located and mounted between the columns.

9. The apparatus of claim 8 further comprising:
- mounting notches disposed at the top end of each column and located on a top surface thereof;
- mounting lips extending outwardly from the left and right ends of the crossbar and configured for insertion into the mounting notches in order to correctly locate the crossbar between the columns; and
- fasteners extending through the mounting lips and into the mounting notches for attaching the crossbar to the columns.

10. The apparatus of claim 1 wherein the opposing ends of the support frames are configured to mount to the left and right sides of the vehicle such that the cover panel extends laterally across the open bed when mounted between the support frames.

11. The apparatus of claim 1 wherein the cover is formed using corrugated plastic sheets.

12. An apparatus for covering a roll cage of a vehicle, the apparatus comprising:
- a plurality of roll cage mounts configured to removably mount to bars of the roll cage, each roll cage mount comprising:
  - a rigid first portion having a lower surface configured to partially encircle a portion of a bar of the roll cage and an upper surface opposite the lower surface;
  - an adjustable second portion fixedly mounted adjacent an outer end of the semicircular lower surface and adjustably and releasably mountable to an inner end of the semicircular lower surface, such that when one side of a bar is located within the semicircular lower surface the adjustable second portion may extend from the outer end of the lower surface, over an opposite side of the bar, and then be secured to the inner end of the lower surface to mount the cage mount to the bar;
- a one-piece cover configured to removably mount to the rigid first portion of the plurality of roll cage mounts; and
- fasteners for passing through the cover and into the upper surface of the rigid first portion of each cage mount for removably mounting the cover to the cage mounts.

13. The apparatus of claim 12 wherein the cover has two or more rigid flat sections that are separated by bendable sections.

14. The apparatus of claim 13 wherein each of the bendable sections is formed by a plurality of notches with sides that expand apart when the cover is flat and that contract together when the cover is bent at the bendable sections.

15. The apparatus of claim 12 wherein the adjustable second portion comprises a strap having notches and wherein the rigid first portion comprises a slot disposed on the inner end of the lower surface that is configured to receive the strap and a catch located proximate the slot that is configured to engage the notches of the strap, wherein when the strap is pulled through the slot the catch engages one of the notches and securely holds the strap through its engagement with the selected notch until the catch is released.

16. The apparatus of claim 12 further comprising padding on the lower surface of the of the rigid first portion for protecting the bars of the roll cage and for reducing movement of the roll cage mount on the bars.

17. The apparatus of claim 12 wherein the upper surface of the rigid first portion includes a horizontal top section, a vertical side section, and a curved section joining the top and side sections.

18. The apparatus of claim 17 wherein, at each roll cage mount, the cover has two flat sections that are separated by a bendable section and wherein one flat section is configured to mount to the horizontal top section of the rigid first portion, one flat section is configured to mount to the vertical side section, and the bendable section of the cover covers the curved section of the rigid first portion.

19. The apparatus of claim 18 wherein each of the bendable sections is formed by a plurality of notches with sides that expand apart when the cover is flat and that contract together when the cover is bent at the bendable sections.

* * * * *